United States Patent [19]
Zollinger

[11] Patent Number: 5,309,844
[45] Date of Patent: May 10, 1994

[54] FLEXIBLE PIPE CRAWLING DEVICE HAVING ARTICULATED TWO AXIS COUPLING

[75] Inventor: William T. Zollinger, Martinez, Ga.

[73] Assignee: The United States of America as represented by the United States Department of Energy, Washington, D.C.

[21] Appl. No.: 64,880

[22] Filed: May 24, 1993

[51] Int. Cl.⁵ .............................................. B61B 13/10
[52] U.S. Cl. .................................................. 104/138.2
[58] Field of Search ...................... 104/138.1, 138.2; 105/3, 176, 365; 213/75 R

[56] References Cited

U.S. PATENT DOCUMENTS

| | | | |
|---|---|---|---|
| 1,564,740 | 12/1925 | Winn | 180/14.1 X |
| 2,742,259 | 4/1956 | Boucher | 104/138.2 X |
| 2,933,143 | 4/1960 | Robinson et al. | 180/14.1 |
| 3,199,622 | 8/1965 | Cook | 180/14.1 |
| 3,758,050 | 9/1973 | Watts et al. | 104/138.2 X |
| 4,285,242 | 8/1981 | Braithwaite | 73/623 |
| 4,285,243 | 8/1981 | Collingwood | 73/623 |
| 4,862,808 | 9/1989 | Hedgcoxe et al. | 104/138.2 |
| 4,938,081 | 7/1990 | Negishi | 73/865.8 |
| 4,953,412 | 9/1990 | Rosenberg et al. | 73/865.8 |
| 5,018,451 | 5/1991 | Hapstack | 104/138.2 |
| 5,080,020 | 1/1992 | Negishi | 104/138.2 |
| 5,121,694 | 6/1992 | Zollinger | 104/138.2 |

Primary Examiner—Robert J. Oberleitner
Assistant Examiner—S. Joseph Morano
Attorney, Agent, or Firm—Brian R. Tumm; Harold M. Dixon; William R. Moser

[57] ABSTRACT

An apparatus for moving through the linear and non-linear segments of piping systems. The apparatus comprises a front leg assembly, a rear leg assembly, a mechanism for extension and retraction of the front and rear leg assembles with respect to each other, such as an air cylinder, and a pivoting joint. One end of the flexible joint attaches to the front leg assembly and the other end to the air cylinder, which is also connected to the rear leg assembly. The air cylinder allows the front and rear leg assemblies to progress through a pipe in "inchworm" fashion, while the joint provides the flexibility necessary for the pipe crawler to negotiate non-linear piping segments. The flexible connecting joint is coupled with a spring-force suspension system that urges alignment of the front and rear leg assemblies with respect to each other. The joint and suspension system cooperate to provide a firm yet flexible connection between the front and rear leg assemblies to allow the pivoting of one with respect to the other while moving around a non-linear pipe segment, but restoring proper alignment coming out of the pipe bend.

20 Claims, 2 Drawing Sheets

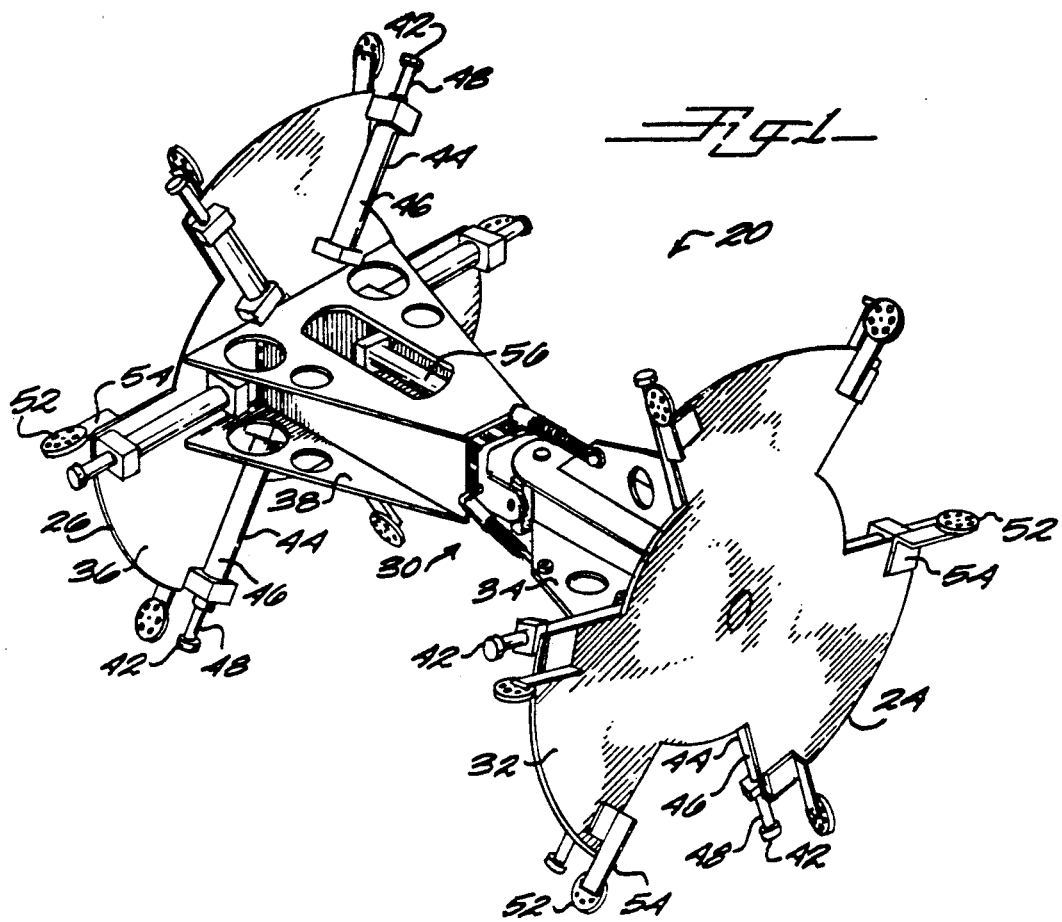

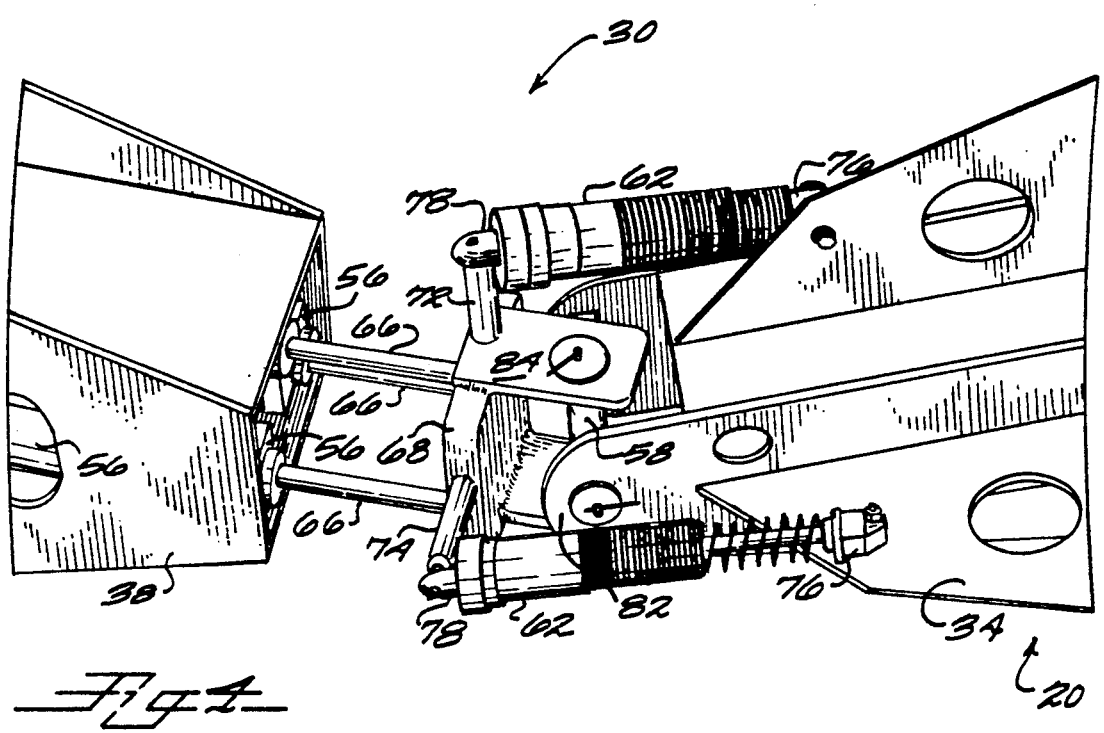

FLEXIBLE PIPE CRAWLING DEVICE HAVING ARTICULATED TWO AXIS COUPLING

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to devices for crawling through pipes. More particularly, the present invention relates to a pipe crawler having the flexibility necessary to efficiently negotiate bends in piping systems.

2. Discussion of Background

Although vehicles for moving through piping systems have been known for some time, significant drawbacks continue to exist with such pipe crawlers. Namely, current pipe crawlers have difficulty negotiating non-linear segments of piping within the piping systems.

Typically, pipe crawlers comprise a front leg assembly, a rear leg assembly and an extendible body connecting the two leg assemblies. The leg assemblies and body cooperate to move in an "inchworm"-like manner through piping. When the legs of the rear leg assembly extend to engage the inner wall of the piping, the front legs can retract and be moved by extending the body forward through the piping. Then the front legs can extend to engage the wall of the pipe so that the rear legs can retract and the body retract, allowing the rear leg assembly to be pulled toward the front leg assembly. This "inchworm" type of motion allows the pipe crawler to progress through piping systems that are, for the most part, linear.

For example, U.S. Pat. No. 5,121,694 issued June 1992 to the author of the device described herein and commonly assigned, describes such a pipe crawler. Additionally, a patent application with Ser. No. 730,425, filed July 1991 by Hapstack, describes an instrumentation carriage adaptable for use with U.S. Pat. No. 5,121,694. Although the means for connecting the pipe crawler in U.S. Pat. No. 5,121,694 and the Ser. No. 730,425 instrumentation carriage exhibits some flexibility, neither device alone has the requisite degree of flexibility for efficiently negotiating non-linear segments of piping.

Other pipe crawlers exist that also have varying degrees of flexibility, yet none is believed to be effective for moving through non-linear piping segments, that is, around pipe elbows, bends and the like. For instance, Negishi, in U.S. Pat. Nos. 5,080,020 and 4,938,081, alternately forces pressurized fluid into and out of an elastic, contractible body to advance the device along tubular or columnar members having linear and non-linear segments.

Similarly, Collingwood, in U.S. Pat. No. 4,285,242, and Braithwaite, in U.S. Pat. No. 4,285,242, disclose pipe inspection vehicles having flexible joints mounted within the body of the vehicle. However, both Collingwood and Braithwaite use the joints to restrain movement, rather than to provide flexibility for the vehicles.

Despite the well known existence of pipe crawling devices, there still remains a need for pipe crawlers that can better negotiate non-linear segments of piping systems.

SUMMARY OF THE INVENTION

According to its major aspects and broadly stated, the present invention is an apparatus for moving through systems of piping. In particular, it is a pipe crawler having the flexibility necessary to progress effectively through both linear and non-linear segments of piping systems. The pipe crawler comprises a front leg assembly, a rear leg assembly, means for extension and retraction of the front and rear legs assemblies, such as an air cylinder, and a flexible joint adjacent the extension/retraction means for enabling the leg assemblies to pivot or rotate with respect to each other. Preferably, one end of the flexible joint attaches to the front leg assembly and the other end to the air cylinder. The rear leg assembly connects to the other end of the air cylinder. The air cylinder allows the front and rear leg assemblies to progress in an "inchworm" manner, while the joint provides the flexibility necessary for the pipe crawler to negotiate the non-linear piping segments. The flexible joint is combined with means for urging proper alignment of the front and rear leg assemblies with respect to each other, preferably a spring-based suspension system.

A major feature of the present invention is the combination of the flexible joint and suspension system. The combination provides a firm yet flexible connection allowing the front and rear leg assemblies to rotate or pivot with respect to one another while moving around a bend in a pipe and restoring proper alignment when the pipe straightens. A particular advantage of this feature is that the front leg assembly can be extended farther out in front of the rear leg assembly during progression of the device through non-linear pipe segments without causing slippage of either leg assembly. Such slippage prevents efficient movement of the pipe crawler. However, the flexibility between the front and rear leg assemblies allows a pipe bend to be negotiated in fewer "inchworm" steps and virtually without any slippage of leg assemblies, improving the efficiency and speed of the pipe crawler.

Another feature of the present invention is the orientation of the flexible joint and suspension system with respect to the extension and retraction means. The flexible joint and suspension system connect to the extension and retraction means in such a way that the operation of each is not impeded. Specifically, one end of the flexible joint and one end of the suspension system connect to the front leg assembly and the other end of each attaches to the extension/retraction means. Similarly, one end of the extension/retraction means connects to the rear leg assembly while the other end attaches to the joint and the suspension system. This arrangement allows efficient operation of both functions because the restorative action of the suspension system and rotation of the joint are separated from the extending and retracting of the air cylinder.

Still another feature is the constant-tension suspension system biased toward alignment of the front and rear leg assemblies. The term "alignment" means that the planes of the front and rear leg assemblies are parallel to each other. Whether aligned or not, the planes of the front and rear leg assemblies are perpendicular to the axis of the pipe, and as the pipe bends, this axis curves and the front and rear leg assemblies will be out of alignment until the pipe straightens. This feature assures that each leg assembly will engage the interior surface of the piping system during movement of the pipe crawler, especially around bends in the piping, and alignment between the front and rear leg assemblies will be restored when the pipe straightens.

Another important feature of the present invention is the pivot, which is preferably a gimbal so that at least two degrees of freedom are available for negotiating horizontal and vertical pipe bends. A gimbal not only provides the requisite flexibility but also can be sufficiently sturdy and reliable for operation in harsh environments.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a pipe crawling device according to a preferred embodiment of the present invention;

FIG. 2 is a partial cross-section view of a pipe with the pipe crawling device of FIG. 1 in a retracted state during movement through a linear segment of piping;

FIG. 3 is a partial cross-section view of a pipe with the pipe crawling device of FIG. 1 in an extended state during movement of the device through a non-linear segment of piping; and FIG. 4 is an detailed, perspective view of the flexible joint and suspension system shown in an extended state.

DETAILED DESCRIPTION OF A PREFERRED EMBODIMENT

In the following description similar components are referred to by the same reference numeral in order to simplify the understanding of the sequential aspect of the drawings.

Referring now to FIG. 1, the pipe crawling device 20 in its preferred embodiment has a front leg assembly 24 and a rear leg assembly 26, each preferably made of a strong but lightweight metal such as aluminum. Front leg assembly 24 and rear leg assembly 26 are joined by a connecting means (shown generally as 30).

Front leg assembly 24 is preferably comprised of a front plate 32, or other planar member, preferably round or octagonal in configuration and dimensioned to fit easily in pipes of different diameters, connected to a front frame 34. Similarly, rear leg assembly 26 is preferably comprised of a rear plate 36 having a shape similar to that of front plate 32 and connected to a rear frame 38.

Plates 32, 36 each have a plurality of foot pads 42 mounted for radial deployment. Each pad of foot pads 42 is moved radially between an extended position and a retracted position by an actuator 44, which is preferably an air cylinder 46 having a ram 48 slidably positioned therein. When actuators 44 are in an extended position, that is, when rams 48 are extended radially outward from air cylinders 46, pads 42 can engage the inner wall of a piping segment 50 (see leg assembly 26 in FIGS. 2 and 3).

Adjacent to each pad of foot pads 42 is a wheel 52 having a mount 54. Each mount 54 positions its corresponding wheel 52 so that the axis I 0 of rotation of wheels 52 is perpendicular to the axes of plates 32, 36 and the direction of movement of device 20. When actuators 44 are in a retracted position, that is, when rams 48 are retracted radially within air cylinders 46, pads 42 are radially inside a circular boundary defined by a diameter extending from the axis of the piping system to the outermost portion of wheels 52. Thus, wheels 52 are free to rotate so that device 20 can move along the inner wall of piping 50.

Referring to FIG. 4, connecting means 30 comprises an extending and retracting means, preferably one or more air cylinders 56, and pivoting means, preferably a joint 58 that is coupled with a plurality of spring force members 62 to provide a inn yet flexible connection between front leg assembly 24 and rear leg assembly 26. Joint 58 is preferably a gimbal rotatable about two axes, thus allowing the planes of front leg assembly 24 and rear leg assembly 26 to pivot and rotate both vertically and horizontally with respect to each other as device 20 moves into vertical and horizontal bends in piping 50.

Spring force members 62 are preferably four suspension springs, shock absorbers or other comparable means biased in an extended position and oriented around joint 58 so that the constant tension provided urges alignment between front leg assembly 24 and rear leg assembly 26 with respect to each other. That is, the orientation of spring force members 62 around joint 58 urges the planes of front and rear leg assemblies 24, 26 to be parallel to each another. Unless moved out of alignment by a curve in piping 50 (see FIG. 3), spring force members 62 hold front and rear leg assemblies 24, 26 so that they are aligned with respect to each other.

Each air cylinder of air cylinders 56 (see FIGS. 1-3) slidably carries a retractable ram 66. Air cylinders 56 increase, during extension, and decrease, during retraction, the distance between front leg assembly 24 and rear leg assembly 26.

A connection plate 68 (see FIG. 4), having a series of spokes 72, 74, is used to connect spring force members 62 around joint 58. Spring force members 62 have a first end 76 connecting to front frame 34 and a second end 78 connecting to spokes 72, 74. Joint 58 is configured so that it has a first end 82 attached to front frame 34 and a second end 84 connected directly to connection plate 68. Also, rams 66 connect directly to connection plate 68. Air cylinders 56, which carry rams 66, are attached along rear frame 38, preferably orthogonal to rear leg assembly 26 (see FIG. 1).

Since connection plate 68 effectively separates the rotation and pivoting of joint 58 and spring force members 62 from the extension/retraction of air cylinders 56, neither operation interferes with or impedes the operation of the other. Thus, the particular arrangement described above provides for efficient operation of device 20.

Device 20 is adapted for carrying equipment necessary for operation, namely hoses and valve systems for air cylinders 46, 56. Also, device 20 is adaptable for mounting other equipment for use within a piping system, such as welding, measuring and other testing equipment. Preferably, such equipment is mounted on the outer face of front plate 32, with equipment wiring and the like mounted on or passing through openings formed in front frame 34 and rear frame 38, both of which are well suited to carry cable bundles or other peripheral items.

In use, device 20 is outfitted with equipment necessary for the particular application, such as welding and the like, and positioned within a piping system (see FIGS. 2 and 3). Preferably, the piping system is a series of piping segments 50 having a diameter not larger than the diameter of device 20 when foot pads 42 are extended.

Once positioned inside of the piping system, device 20 begins moving through linear and non-linear segments of piping 50 in the previously mentioned "inchworm" manner. The movement is typified by the following sequence: (1) air cylinders 46 located on rear leg assembly 26 are extended so that pads 42 extending from rear leg assembly 26 firmly engage the inner wall of piping 50; (2) air cylinders 46 located on front leg assembly 24 are retracted so that wheels 52 mounted on front leg assembly 24 are free to travel along the interior surface of piping 50; (3) air cylinders 56 are extended, thereby increasing the distance between front leg assembly 24 and rear leg assembly 26 so that front leg assembly 26 can move forward along the interior surface of piping 50; (4) once air cylinders 56 have been extended the desired amount, air cylinders 46 located on front leg assembly 24 are extended radially so that pads 42 extending from front leg assembly 24 firmly engage the interior surface of piping 50; (5) air cylinders 46 located on rear leg assembly 26 are retracted so that wheels 52 mounted on rear leg assembly 26 are free to travel along the interior surface of piping 50; and (6) air cylinders 56 are retracted thereby decreasing the distance between front leg assembly 24 and rear leg assembly 26 as rear leg assembly 26 moves forward along the interior surface of piping 50 (as shown being completed in FIG. 2).

The steps mentioned above are repeated until device 20 reaches its desired location within the piping system. During occasions when device 20 must travel through non-linear segments of piping 50 (see FIG. 3), the flexibility of joint 58 allows front leg assembly 24 to remain perpendicular to the axis of piping 50 while traveling through the "bend", thus preventing pads 42 extending from rear leg assembly 26 from slipping or lifting off of the interior surface of piping 50. Actually, the flexibility of joint 58 allows both front leg assembly 24 and rear leg assembly 26 to remain perpendicular to the axis of piping 50, even around piping bends, thus maintaining the optimal engaging position for pads 42 during movement of device 20.

Similarly, once front leg assembly 24 has passed through a non-linear segment of piping 50, pads 42 extending from front leg assembly 24 engage the interior surface of piping 50 while rear leg assembly 26 is "pulled" through the bend (as shown in FIG. 3) by the retraction of air cylinders 64.

The constant tension provided by spring force members 62, which are biased in an extended position, contributes to pads 42 maintaining their engaging position against the interior surface of piping 50 during movement of device 20 around non-linear segments of piping 50. Thus, device 20 continues moving forward through piping 50 as efficiently as possible, even through sharp bends in piping 50.

Since spring force members 62 are constantly urging axial alignment of front leg assembly 24 and rear leg assembly 26 with respect to each other; rear leg assembly 26 constantly attempts to align itself with front leg assembly 24 when device 20 travels through non-linear segments of piping 50. Thus, additional engaging pressure is exerted by pads 42 on the inner wall of piping 50.

The "inchworm" movement by device 20 is continued through piping 50, through both linear and non-linear segments, until device 20 reaches the desired location within the piping system.

It will be apparent to those skilled in the art that many changes and substitutions can be made to the preferred embodiment herein described without departing from the spirit and scope of the present invention as defined by the appended claims.

What is claimed is:

1. Apparatus for moving through a pipe having an axis and a wall, said pipe having bends wherein said axis curves, said apparatus comprising:
   a front leg assembly defining a first plane generally perpendicular to said axis, said front leg assembly having
      a first plurality of feet, and
      a first plurality of actuators, each actuator in operative connection with one foot of said first plurality of feet, said each actuator moving said foot radially with respect to said axis between an extended position and a retracted position;
   a rear leg assembly defining a second plane generally perpendicular to said axis, said front leg assembly separated from said rear leg assembly by a distance, said front and rear leg assemblies having a nominal alignment whereby said first and second planes are parallel, said rear leg assembly having
      a second plurality of feet, and
      a second plurality of actuators, each actuator in operative connection with one foot of said second plurality of feet, said each actuator moving said foot radially with respect to said axis between an extended position and a retracted position; and
   means connected to said front and rear leg assemblies for changing said distance and said alignment of said front and rear leg assemblies with respect to each other, said front and said rear leg assemblies moving between a retracted position and an extended position as said changing means changes said distance, said distance being greater when said front and said rear leg assemblies are in said extended position than when in said retracted position, said alignment of said first and said second planes changing from said nominal alignment in response to lateral pressure on said apparatus by a bend in said pipe, said changing means including a joint rotatable about at least two axes of rotation.

2. The apparatus as recited in claim 1, further comprising means connecting said front leg assembly and said changing means for urging said front and rear leg assemblies toward said nominal alignment.

3. The apparatus as recited in claim 1, further comprising a plurality of springs connecting said front leg assembly and said changing means for urging said front and rear leg assemblies toward said nominal alignment.

4. The apparatus as recited in claim 1, wherein said changing means is adapted to change said alignment of said front and rear leg assemblies about two axes of rotation, each of said two axes being generally perpendicular to said axis and to each other.

5. The apparatus as recited in claim 1, wherein said joint further comprises a gimbal for enabling said apparatus to respond to changes in said alignment of said front and rear leg assemblies.

6. The apparatus as recited in claim 1, wherein said joint is oriented so that each axis of rotation is generally perpendicular to said axis and to each other, said joint responding to changes in said alignment of said front and rear leg assemblies.

7. The apparatus as recited in claim 1, wherein said clamping means further comprises a joint for enabling said apparatus to respond to changes in said alignment of said front and rear leg assemblies, and said apparatus further comprising means connecting said front leg assembly and said changing means for urging said front and rear leg assemblies toward said nominal alignment.

8. The apparatus as recited in claim 1, wherein said changing means further comprises:
    at least one air cylinder connected to said rear leg assembly; and
    at least one ram, each ram slidably carried within each air cylinder of said at least one air cylinder and connected to said front leg assembly, said ram moving said front leg assembly in response to actuation of said air cylinder whereby said distance between said front and rear leg assemblies changes.

9. The apparatus as recited in claim 1, wherein said changing means further comprises:
    a joint for enabling said apparatus to respond to changes in said alignment of said front and rear leg assemblies;
    at least one air cylinder connected to said rear leg assembly; and
    at least one ram, one ram carried within each cylinder of said at least one air cylinder and connected to said front leg assembly, said ram moving said front leg assembly in response to activation of said air cylinder whereby said distance between said front and rear leg assemblies changes.

10. Apparatus for moving through a pipe having an axis and a wall, said pipe having bends wherein said axis curves, said apparatus comprising:
    a front leg assembly defining a first plane generally perpendicular to said axis, said front leg assembly having
        a first plurality of feet, and
        a first plurality of actuators, each actuator in operative connection with one foot of said first plurality of feet, said each actuator moving said foot radially with respect to said axis between an extended position and a retracted position;
    a rear leg assembly defining a second plane generally perpendicular to said axis, said front leg assembly separated from said rear leg assembly by a distance, said front and rear leg assemblies having a nominal alignment whereby said first and second planes are parallel, said rear leg assembly having
        a second plurality of feet, and
        a second plurality of actuators, each actuator in operative connection with one foot of said second plurality of feet, said each actuator moving said foot radially with respect to said axis between an extended position and a retracted position; and
    means for connecting said front and rear leg assemblies, said connecting means including
        first means for changing said distance between said front and rear leg assemblies, said front and said rear leg assemblies moving between a retracted position and an extended position as said first changing means changes said distance, said distance being greater when said front and said rear leg assemblies are in said extended position than when in said retracted position, said first changing means having a first end and a second end, said first end connected to said rear leg assembly, and a joint rotatable about at least two axes of rotation for changing said alignment of said front and rear leg assemblies with respect to each other, said alignment of said first and said second planes changing from said nominal alignment in response to lateral pressure on said apparatus by a bend in said pipe, said second means having a third end connected to said front leg assembly and a fourth end connected to said second end.

11. The apparatus as recited in claim 10, further comprising means for urging said front and rear leg assemblies toward said nominal alignment, said urging means having a fifth end connected to said front leg assembly and a sixth end connected to said second end.

12. The apparatus as recited in claim 10, further comprising a plurality of springs for urging said front and rear leg assemblies toward said nominal alignment, each of said plurality of springs having a fifth end connected to said front leg assembly and a sixth end connected to said second end.

13. The apparatus as recited in claim 10, wherein said joint further comprises a gimbal for enabling said apparatus to respond to changes in said alignment of said front and rear leg assemblies.

14. The apparatus as recited in claim 10, wherein said second changing means further comprises a joint for enabling said apparatus to respond to changes in said alignment of said front and rear leg assemblies, and said apparatus further comprises means for urging said front and rear leg assemblies toward said nominal alignment, said urging means having a fifth end connected to said front leg assembly and a sixth end connected to said second end.

15. The apparatus as recited in claim 10, wherein said first changing means further comprises:
    at least one air cylinder connected to said rear leg assembly; and
    at least one ram, each ram slidably carried within each air cylinder of said at least one air cylinder and connected to said fourth end, said ram moving said front leg assembly in response to actuation of said air cylinder whereby said distance between said front and rear leg assemblies changes.

16. The apparatus as recited in claim 10, wherein said second changing means further comprises a joint for enabling said apparatus to respond to changes in said alignment of said front and rear leg assemblies, and wherein said first changing means further comprises:
    at least one air cylinder connected to said rear leg assembly; and
    at least one ram, each ram slidably carried within each air cylinder of said at lest one air cylinder and connected to said fourth end, said ram moving said front leg assembly in response to actuation of said air cylinder whereby said distance between said front and rear leg assemblies changes.

17. Apparatus for moving through a pipe having an axis and a wall, said pipe having bends wherein said axis curves, said apparatus comprising:
    a front leg assembly defining a first plane generally perpendicular to said axis, said front leg assembly having
        a first plurality of feet,
        a first plurality of actuators, each actuator in operative connection with one foot of said first plurality of feet, said each actuator moving said foot radially with respect to said axis between an extended position and a retracted position, and a first plurality of wheels, each of said first plurality of wheels radially adjacent to one foot of said first plurality of feet and having a axis of rotation perpendicular to the direction of movement of said apparatus;

a rear leg assembly defining a second plane generally perpendicular to said axis, said front leg assembly separated from said rear leg assembly by a distance, said front and rear leg assemblies having a nominal alignment whereby said first and second planes are parallel, said rear leg assembly having a second plurality of feet, a second plurality of actuators, each actuator in operative connection with one foot of said second plurality of feet, said each actuator moving said foot radially with respect to said axis between an extended position and a retracted position, and a second plurality of wheels, each of said second plurality of wheels radially adjacent to one foot of said second plurality of feet and having a axis of rotation perpendicular to the direction of movement of said apparatus;

means for connecting said front and rear leg assemblies, said connecting means including first means changing said distance between said front and rear leg assemblies, said front and said rear leg assemblies moving between a retracted position and an extended position as said first changing means changes said distance, said distance being greater when said front and said rear leg assemblies are in said extended position than when in said retracted position, said first changing means having a first end and a second end, said first end connected to said rear leg assembly, and a joint for changing said alignment of said front and rear leg assemblies with respect to each other and for enabling said apparatus to respond to changes in said alignment of said front and rear leg assemblies, said alignment of said first and said second planes changing from said nominal alignment in response to lateral pressure on said apparatus by a bend in said pipe, said joint having a third end connected to said front leg assembly and an a fourth end connected to said second end; and means for urging said front and rear leg assemblies toward said nominal alignment, said urging means having a fifth end connected to said front leg assembly and a sixth end connected to said second end.

18. The apparatus as recited in claim 17, wherein said urging means further comprises a plurality of springs, each of said plurality of springs having a fifth end connected to said front leg assembly and a sixth end connected to said second end.

19. The apparatus as recited in claim 17, wherein said first changing means further comprises:

at least one air cylinder connected to said rear leg assembly; and at least one ram, each ram slidably carried within each air cylinder of said at least one air cylinder and connected to said fourth end, said ram moving said front leg assembly in response to actuation of said air cylinder whereby said distance between said front and rear leg assemblies changes.

20. The apparatus as recited in claim 17, wherein said joint is rotatable about two axes of rotation, each axis of rotation being generally perpendicular to said axis and to each other, and wherein said urging means further comprises a plurality of springs.

* * * * *